United States Patent [19]

Jamzadeh et al.

[11] Patent Number: 5,175,628
[45] Date of Patent: Dec. 29, 1992

[54] MEMORY MANAGEMENT FOR ELECTRONIC COLOR PRINTER

[75] Inventors: Fereidoon S. Jamzadeh, Fairport; Thomas L. Rockwell, Rochester, both of N.Y.

[73] Assignee: Eastman Kodak Company, Rochester, N.Y.

[21] Appl. No.: 767,712

[22] Filed: Sep. 30, 1991

[51] Int. Cl.$^5$ .................. H04N 1/21; H04N 1/29; H04N 1/46

[52] U.S. Cl. ........................ 358/300; 358/78

[58] Field of Search .............. 358/300, 444, 78, 75; 346/157

[56] References Cited

U.S. PATENT DOCUMENTS

| | | | |
|---|---|---|---|
| 4,896,146 | 1/1990 | Narumiya | 358/78 |
| 4,994,827 | 2/1991 | Jamzadeh | 346/157 |
| 5,099,336 | 3/1992 | Moriya | 358/300 |

Primary Examiner—Benjamin R. Fuller
Assistant Examiner—Scott A. Rogers
Attorney, Agent, or Firm—Warren W. Kurz

[57] ABSTRACT

A method and apparatus for managing the storage of image data in a framestore of an electronic color printing system so as to minimize the storage requirements of the framestore. In such a system, image data is read out from the framestore in a color-separated sequence (R1-Rn; G1-Gn; B1-Bn) which differs substantially from a color-integrated sequence (R1,G1,B1-Rn,Gn,Bn) in which image data is received by the framestore from an input image scanner. According to the invention, values representing such color-integrated data from the image scanner are stored at address locations in the framestore vacated by the immediately preceding data read-out step. Such data management obviates the need for two separate framestores, each being capable of storing a sufficient number of multiple color-separated images to produce a desired array of multicolor images on a single receiver sheet.

10 Claims, 7 Drawing Sheets

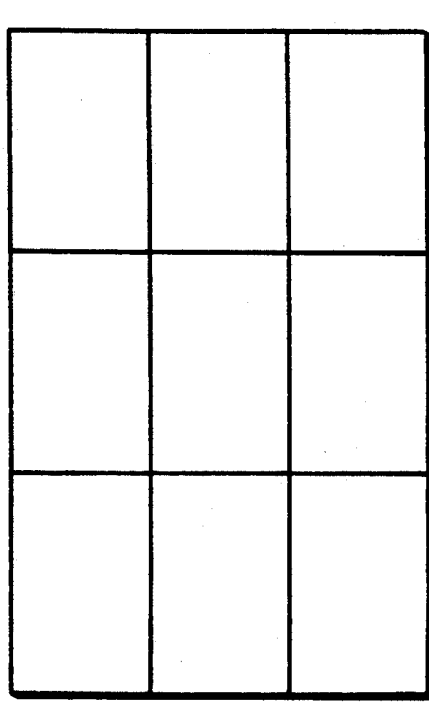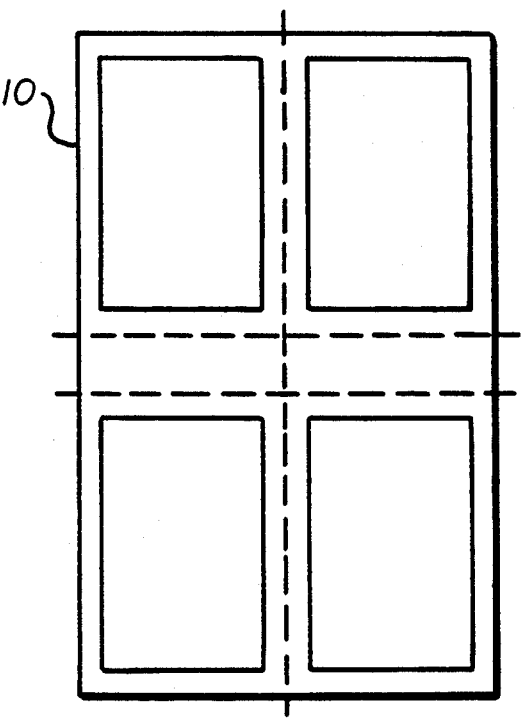
FIG. 2    FIG. 3
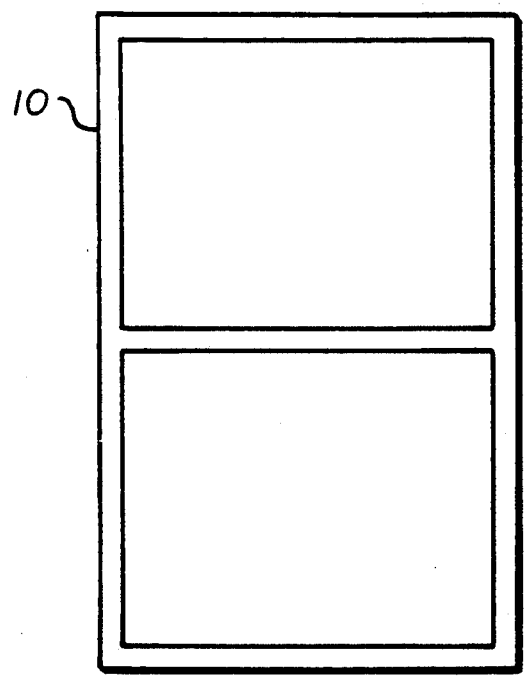
FIG. 4

FIG. 17

SCAN: F5, F6, F7, F8

STORE: R5 | G6 | B7 | G5 | B6 | R8 / B5 | R7 | G8 | R6 | G7 | B8

PRINT: F5 | F6 / F7 | F8

FIG. 18

SCAN: F9, F10, F11, F12

STORE: R9 | B10 | G12 | G10 | R12 | R10 / B11 | B9 | G11 | G9 | R11 | B12

PRINT: F9 | F10 / F11 | F12

FIG. 19

SCAN: F13, F14, F15, F16

STORE: R13 | R16 | G15 | B14 | R14 | G13 / G16 | B15 | R15 | G14 | B13 | B16

PRINT: F13 | F14 / F15 | F16

FIG. 20

SCAN: F17, F18, F19, F20

STORE: R17 | R18 | R19 | R20 | G17 | G18 / G19 | G20 | B17 | B18 | B19 | B20

PRINT: F17 | F18 / F19 | F20

FIG. 21

SCAN: F21, F22, F23, F24

STORE: R21 | G21 | B21 | R22 | G22 | B22 / R23 | G23 | B23 | R24 | G24 | B24

PRINT: F21 | F22 / F23 | F24

MEMORY MANAGEMENT FOR ELECTRONIC COLOR PRINTER

TECHNICAL FIELD

This invention relates to the field of electronic color printing and, more particularly, to apparatus and methods for managing the flow of information into and out of a framestore in order to minimize its required storage capacity.

BACKGROUND ART

In U.S. patent application Ser. No. 07/488,546, filed Mar. 5, 1990, now U.S. Pat. No. 5,040,026 issued Aug. 13, 1991, entitled MULTICOLOR IMAGE FORMING APPARATUS, in the names of Jamzadeh et al. there is disclosed a color electrophotographic apparatus which is capable of providing a photofinishing operation. Such apparatus operates to sequentially scan each of the image frames of an original filmstrip (e.g. a 35 mm color negative film strip) and produce, by an electrophotographic printing process, full-color prints on a non-photosensitive print-receiver sheet, such as a sheet of paper having a thermoplastic coating. The electrophotographic process involves the steps of forming a set of different color-separated toner images (e.g., cyan, magenta and yellow toner images) on a reusable photoconductive recording element, one set for each original image frame, and transferring such images in registration to the print receiver sheet.

To facilitate sheet handling in the above apparatus, as well as to enhance the efficiency of the overall print-making process, each print receiver sheet is considerably larger is size than the commonly desired sizes of photographic prints. Thus, it is disclosed that several color prints be formed on each receiver sheet. For example, assuming a receiver sheet having a size (in inches) of 12×18, it is disclosed that nine 4×6 prints be produced on the receiver sheet in a three-by-three, two-dimensional array. This three-by-three array, sometimes referred to as a "9-up" format, would be a desirable format due to the current popularity of photographic prints of this 4×6 inch size. In the event larger prints (e.g. 5×7 inch) are desired, four of such prints may be formed on a receiver sheet of this size, in a two-by-two, or "4-up", format. Upon forming multiple images on a receiver sheet, the receiver sheet is cut to provide the smaller format prints or "snapshots".

To produce full color prints by any of the various non-photographic techniques, e.g., by electrophotographic, thermal/dye-sublimation and ink jet techniques, it is necessary to sequentially record a series of color-separated images, viz., cyan, magenta and yellow images, on an image-recording member. These images are either directly recorded, in registration, on the ultimate print-receiving medium, as is the case for thermal and ink-jet recording, or, as indicated above in the case of electrophotographic recording systems, recorded on a reusable recording element from which the images can be transferred, in registration, to the print-receiving medium. In either case, the information required to produce these color-separated images can be provided by scanning a color negative filmstrip, one frame at a time and pixel-by-pixel, with an electronic scanning device, e.g., a color-responsive charge-coupled device (CCD). Such scanning devices provide a set of color-separated signals, each of such signals representing the spectral content of the photographically recorded image at three different wavelength regions, e.g., the red (R), green (G), and blue (B) spectral regions. Alternatively, the color-separated R, G and B signals can be computer-generated or read out from a ROM (e.g., a compact disk).

In conventional photographic photofinishing the print medium takes the form of a strip of photosensitive paper, and multicolor images are printed directly thereon in the same order as they appear on the filmstrip. A strip format is preferred for the photographic print medium since it is much easier to advance an elongated strip through the chemical baths required to develop the latent images formed thereon than it is to advance sheet material through these processing baths. Moreover, since multiple color-separated images can be printed simultaneously and in registration on a photographic emulsion, it is possible to use the output of a film scanner directly to control the exposure source of the printer with little or no need to buffer or store the scanner output.

But in the case of non-photographic photofinishing, where multiple full-color images are to be formed on a single sheet of printing material, there is a need to store relatively vast quantities of color image information before the printing of the first, multiframe, color-separated image frame can begin. For example, before the first color-separated image of a "9-up" format can be formed on the photoconductive recording element of the electrophotographic printer mentioned above, it is necessary to store twenty-seven color-separated images (i.e., nine images times three color separations each).

The conventional approach to satisfying the storage requirements of the above photofinishing system is to provide two discrete framestores, each being capable of storing values representing the different sets of color-separated signals required to produce a desired multiframe print. Such framestores would operate in a so-called "ping-pong" fashion, one framestore receiving information from the input device while the other framestore is providing information to the printer, and vice versa. A drawback of this approach is cost, each megabyte of data storage being relatively costly, and each framestore requiring 40 or more megabytes of storage in order to store sufficient information to produce a "9-up" print of photographic quality.

SUMMARY OF THE INVENTION

In view of the foregoing discussion, an object of this invention is to minimize the storage needs of electronic color printers of the above type.

Another object of this invention is to eliminate the need for two individual framestores in electronic printing apparatus of the type described above.

Still another object of this invention is to provide, in an electronic color printing process, a method for managing the storage of data in a framestore so that the storage capacity of the framestore can be less than twice the number of values associated with those sets of color-separation image signals required to produce a desired display of multicolor image frames on a receiver sheet.

According to a preferred embodiment of the invention there is provided an electronic color printing process in which an array of different multicolor images is produced on each of a plurality of print-receiver sheets from color information signals representing a plurality of sets of color-separated image information (R, G, B), each of such sets representing the color content, within three different spectral regions, of a plurality of multicolor images to be printed, such sets being provided in an image sequence, R1, G1, B1; R2, G2 B2; ... Rn, Gn, Bn, where n is the number of the images to be printed on a receiver sheet. The process of the invention basically comprises the steps of:

a) storing values representing each set of color-separated image information, as produced, in a single framestore at discrete address locations, such framestore having a storage capacity sufficient to hold less than twice the number of values associated with those sets of color-separated image information required to produce a desired two-dimensional array of multicolor images on a print-receiver sheet;

b) reading-out stored values from the framestore in a sequence R1, R2, R3, ... Rn; G1, G2, G3, ... Gn; B1, B2, B3, ... Bn to enable sequential printing of a plurality of different color-separated images of the desired array of multicolor image frames, such different color-separation images being registerable to produce the desired array of multicolor images on a print-receiver sheet; and c) storing values representing subsequently produced sets of color-separated image information at address locations in the framestore vacated by the immediately preceding reading-out step.

According to a preferred embodiment, the above-mentioned information signal is produced by scanning a linear array of multicolor images, one frame after the other, with an electronic scanning device capable of substantially simultaneously providing a plurality of different sets of color-separated image information for each scanned frame, each set representing the color content of each scanned frame in three different spectral regions, all sets of color-separated image information for each frame being produced before the succeeding frame in the linear array is scanned;

The invention and its various advantages will be better understood from the ensuing detailed description of preferred embodiments, reference being made to the accompanying drawings.

BRIEF DESCRIPTION OF THE DRAWINGS

FIGS. 2-4 illustrate various formats in which multicolor images can be printed by the apparatus of FIG. 1;

FIGS. 15-21 illustrate the manner in which image data for a 4-up print is managed in the framestore of the FIG. 1 apparatus.

DETAILED DESCRIPTION OF PREFERRED EMBODIMENTS

Figure 1:
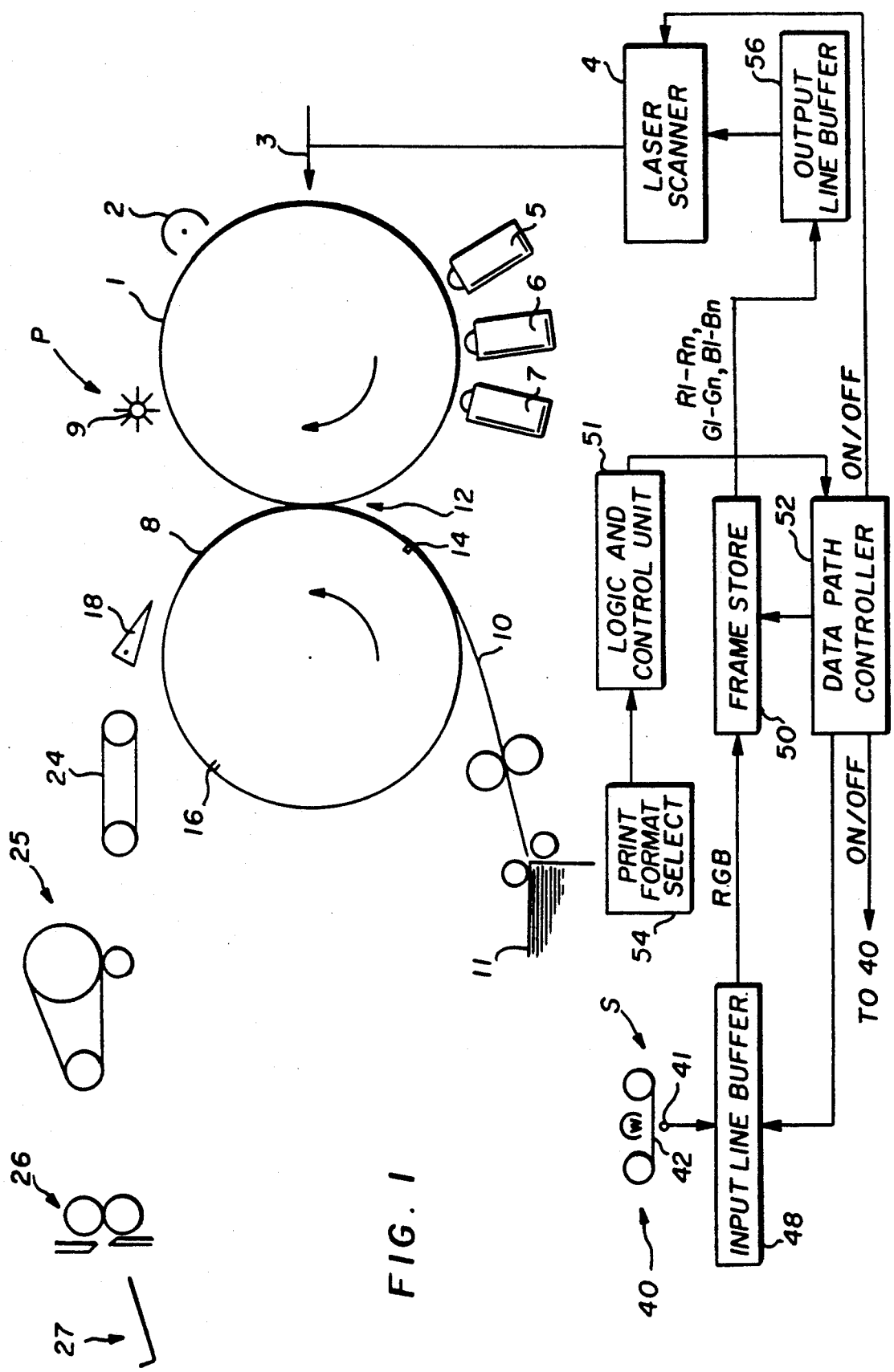
FIG. 1 is a schematic illustration of a color electrophotographic printer embodying the present invention.

FIG. 1 schematically illustrates an electrophotographic photofinishing apparatus embodying the present invention. Such apparatus generally comprises a film scanner S for producing electrical signals representing the color image information in a linear array of color image frames, and an electrophotographic color printer P capable of producing a plurality of multicolor images on a single print-receiver sheet 10. The printer comprises a reusable image recording element, for example, a photoconductive drum 1, which is rotated by a motor, not shown, in a clockwise direction (as viewed in FIG. 1) past a series of processing stations, all well known in the art. These stations include a charging station 2 which operates to uniformly charge the photoconductive surface of the drum 1, and an exposure station 3 for imagewise exposing the uniformly charged surface to create developable electrostatic images thereon. The exposure station may comprise a conventional LED printhead or, as shown, a laser scanner 4. As drum 1 rotates, the intensity of the output beam of laser scanner 4 is modulated with color-separated image information, whereby a series of electrostatic images are produced on the drum surface, each representing a color-separated image of the ultimately desired multicolor print. The series of electrostatic images on drum 1 is rendered visible with different color toner (e.g., cyan, magenta and yellow toner), by development stations 5, 6 and 7 to produce a series of related toner images. These color-separated toner images are then transferred in registration to the print-receiving sheet 10 carried on the periphery of a transfer drum 8. The photoconductive drum 1 is subsequently cleaned at a cleaning station 9 and recycled through the electrophotographic image-forming process.

Print-receiver sheets 10 are fed, seriatim, from a sheet supply 11 to an image-transfer station 12 defined by the nip between drums 1 and 8. As each sheet approaches the development station, it is secured to the transfer drum by vacuum means, gripping fingers or other suitable mechanisms. For example, the leading edge of the sheet can be secured to the transfer drum by a row of vacuum holes 14 and the trailing end by a row of vacuum holes 16. During each rotation of the transfer drum, one color-separated toner image is transferred to a receiver sheet.

After the transfer drum has made three revolutions and three related color-separated toner images have been transferred, in registration, to the surface of the receiver sheet, the leading edge of the receiver sheet is stripped from the transfer of drum 8 by stripping mechanism 18. The receiver sheet is pushed by further rotation of the transfer drum 5 onto a sheet transport 24 which carries it to a fixing device 25. The print-receiver sheet is then cut by a cutting mechanism 26 to provide a plurality of smaller prints, each containing a single multicolor image frame. The resulting prints are collected in a tray 27 or more sophisticated print collecting device.

In the apparatus shown in FIG. 1, each receiver sheet is of a relatively large size, for example, 12 inches by 18 inches. As shown in FIG. 2, such a receiving sheet can provide nine 4×6 images exposed edge-to-edge with no waste. As mentioned above, this format is commonly referred to as the "9-up" format. The other print sizes will produce some waste with a 12×18 inch receiver sheet. FIG. 3 illustrates a "4-up" format in which four 5×7 images are formed on a 12×18 inch receiving sheet. In FIG. 4, a "2-up" format is shown in which two 8×10 images are formed on a 12×18 inch receiver sheet.

The input to exposure station 3 is provided by a conventional electronic color scanner S which includes a color-responsive CCD 41. Suitable scanners are disclosed, for example, in U.S. Pat. Nos. 4,638,371 and 4,639,769, the respective disclosures of which are incorporated herein by reference. Scanner S operates to scan an original multicolor image, e.g., a 35 mm. color negative filmstrip 42, line-by-line and pixel-by-pixel, to produce three color-separated signals, R,G and B, representing the color content of each of the scanned image frames in three spectral regions, i.e., the red (R), green (G) and blue (B) spectral regions. These R,G and B color-separated signals are produced substantially simultaneously and, as they are produced, they are fed to a framestore 50 (discussed below) via an input line buffer 48. The latter serves to buffer a few lines of image data to account for any mechanical latencies at the scanner/framestore interface.

A logic and control units (LCU) 51 operates through a data path controller 52 to control the flow of data into and out of the framestore. In addition to managing the whereabouts of data in the framestore (i.e. providing a bookkeeping function), the LCU receives inputs from various portions of the apparatus, including encoders (not shown) on the photoconductive and transfer drums and transducers on the various processing stations to manage the timing of the entire apparatus. One of the inputs to the LCU is from a print format selector 54 on an operator control panel. By means of selector 54, an operator can chose any of several different print sizes ranging from 4×6, 5×7, 8×10, 11×17 and also 5×7 with borders. Based on the format selected, the LCU instructs the data path controller to extract those pixels from the framestore in the appropriate format required to produce the appropriate format image on the print receiver sheet. For example, if 4×6 prints (i.e. "snapshots") are desired, the LCU instructs the data path controller to extract the stored pixels in a format required to produce the 9-up format on the print receiver sheet. Similarly, if 5×7 inch prints are desired, the LCU commands controller 52 to extract those pixels from memory in the required format to print images in the 4-up format. In either case, the framestore is read out in a sequence required to produce multiple color-separated images on the photoconductive recording element. The data read-out from the framestore is applied to the laser printer via an output line buffer 56 which serves to buffer a few lines of image information to account for latencies in the laser scanner/recording element interface.

As indicated above, an object of this invention is to minimize the storage requirements of framestore 50. This is certainly desirable from the standpoint that, in order to produce one 9-up print, a total of 27 color-separated images must be stored, i.e., 9 images×3 color separations per image. This translates to over 40 megabytes of data if near photographic resolution is to be achieved. The conventional approach would be to use two discrete 40 megabyte framestores to buffer the data from the input scanner. This solution is desirable from the standpoint image data is always stored and extracted from the same address locations within the framestore (albeit in different sequences), and the "bookkeeping" function of the LCU is simplified. The drawback of this approach, however, is that it is a relatively costly solution to the problem.

A less costly approach to the above data storage problem is to use a smaller framestore, such as one capable of storing only that number of color-separation images to be printed, and to manage the data flow into and out of the framestore such that images can be concurrently stored and extracted from the framestore. This concurrent reading and writing of image information to the framestore must be managed very carefully to avoid losing any image data. This matter gets somewhat complicated when one considers the fact that the sequences of reading and writing from and to the framestore are not the same. As noted above, in order to print the first color separation 9-up image on the photoconductive drum, all nine of the "red" separation images must be printed first. Then, all the nine of the "green" separation images, followed by the nine "yellow" separation images. But when images are scanned in by the input scanner, the RG&B color separations of each image frame are generated simultaneously. Therefore, it is necessary to store this information until the need arises to print color-separated images. The manner in which LCU 51 functions in managing the flow of image data to and from the framestore in order to produce a 9-up image format is illustrated in FIGS. 5–14.

Figure 5:
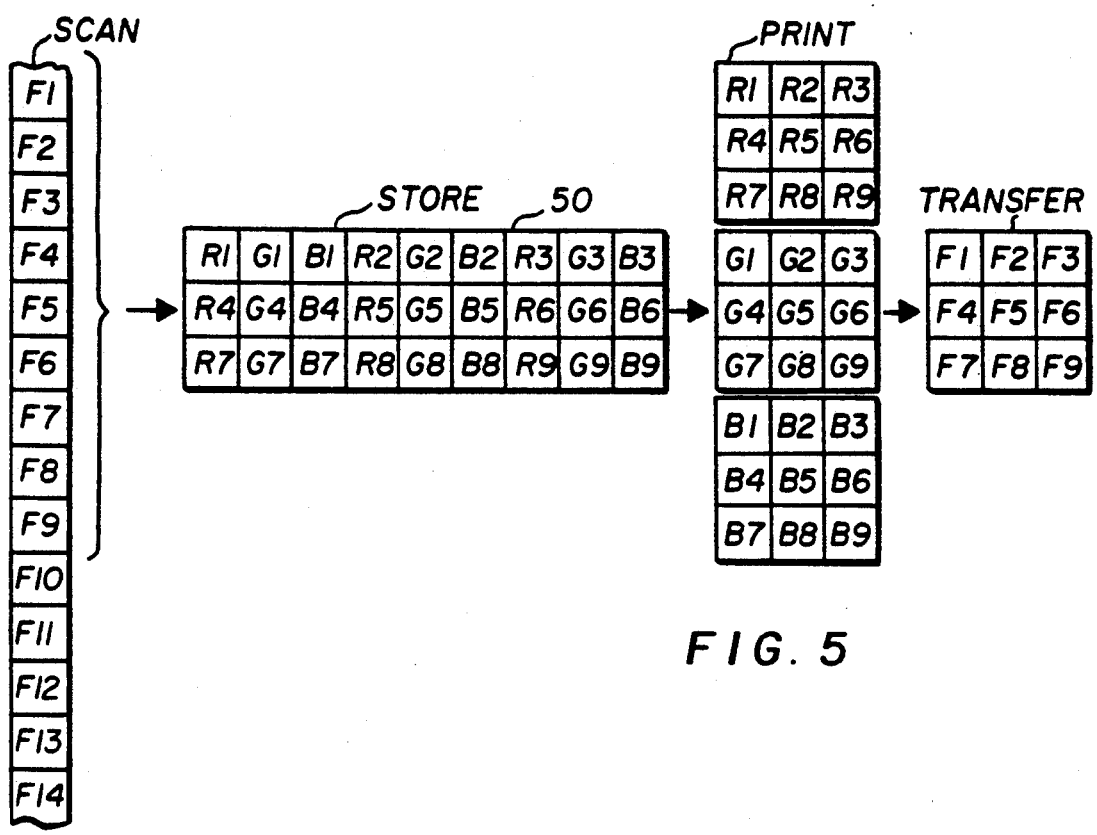
FIG. 5 illustrates the manner in which the FIG. 1 apparatus scans a multicolor filmstrip, stores signals representing color-separated image information, prints color-separated images, and registers such images to provide a multiframe, multicolor print on a receiver sheet.
Figure 6:
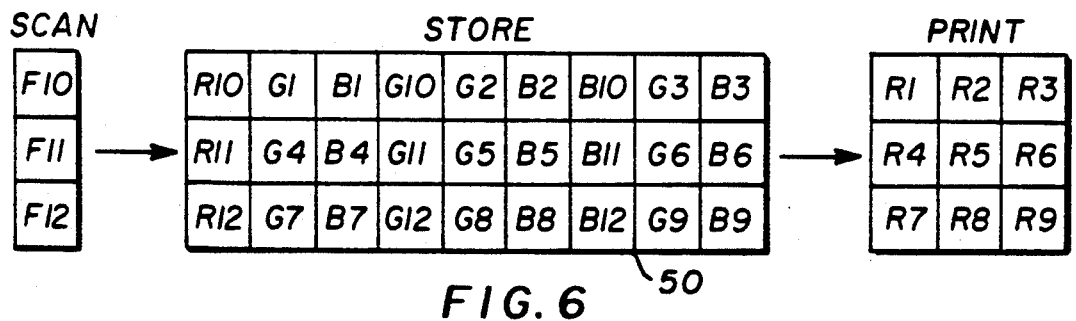
FIGS. 6-14 illustrate the manner in which image data for a 9-up print is managed in the framestore of the FIG. 1 apparatus.
Figure 7:
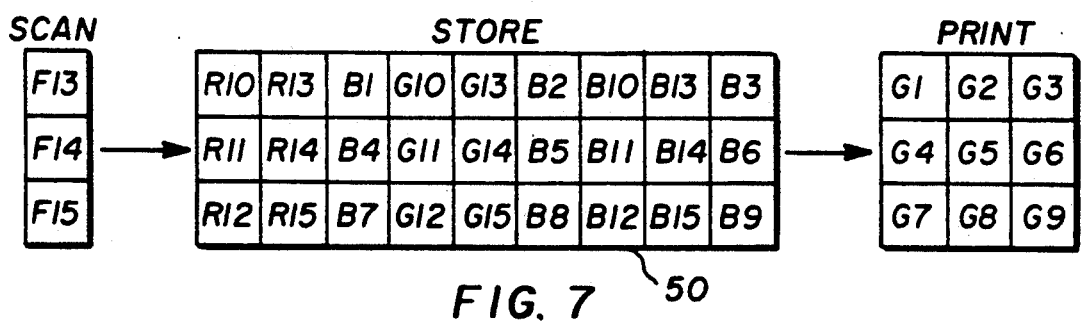
Figure 8:
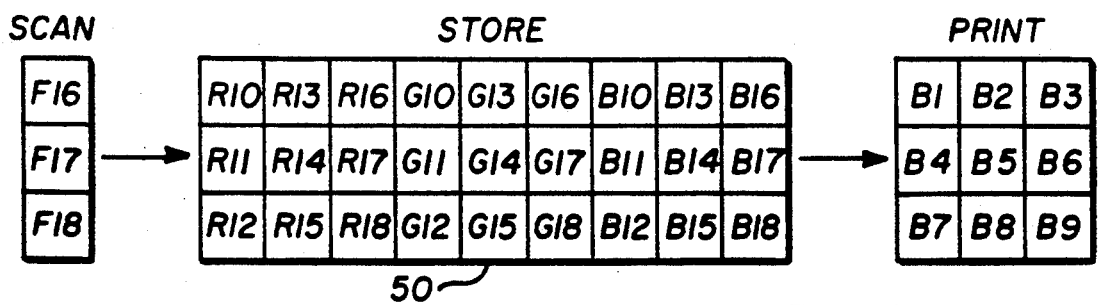

As illustrated in FIG. 5, image frames 1–9 of a filmstrip 42 are scanned, one at a time, to sequentially provide the color-separation signals R1, G1, B1;R1, G2, B2 . . . R9. These signals are stored in framestore 50, as produced, in the format shown. As the "red" separation image of the "9-up" print is printed on the photoconductive drum, the R1-R9 spaces become available for storage. As soon as these spaces are vacated, the input scanner scans frames 10, 11 and 12 and stores the RG&B values for these frames in the vacated R1-R9 spaces. This is shown in FIG. 6 wherein color values R10, G10, B10, R11, G11, B11, R12, G12 and B12 have been stored in the spaces vacated by values R1-R9. Similarly, when the second, or "green", separation is produced, spaces G1-G9 become available in the framestore. Upon being vacated, these spaces are filled with the RG&B values produced by scanning frames 13, 14 and 15 of the original filmstrip. At this time, the framestore format is as shown in FIG. 7. Similarly, when the third, or "blue", color separation of the "9-up" print is recorded, spaces B1-B9 become available and these spaces are immediately filled by the RG&B values associated with frames 16, 17 and 18 of the original filmstrip. As shown in FIG. 8, the framestore now contains the values required to produce the second "9-up" print, that is, it contains the RG&B values for image frames 10–18. It will be noted, however, that these values are organized in the framestore in a manner different from that in which the first nine frames were stored.

Figure 9:
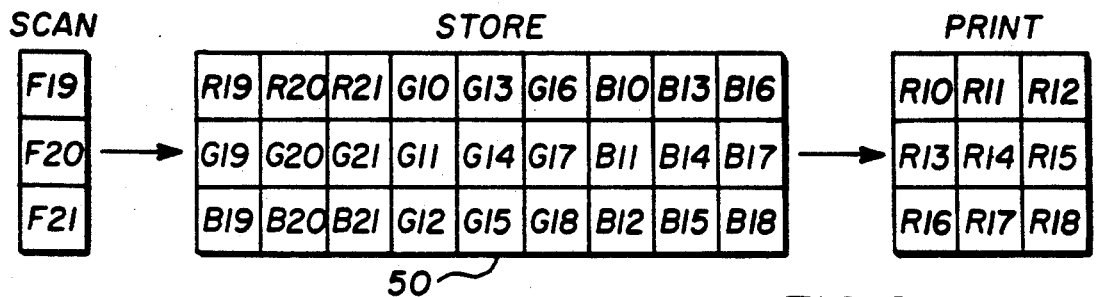
Figure 10:
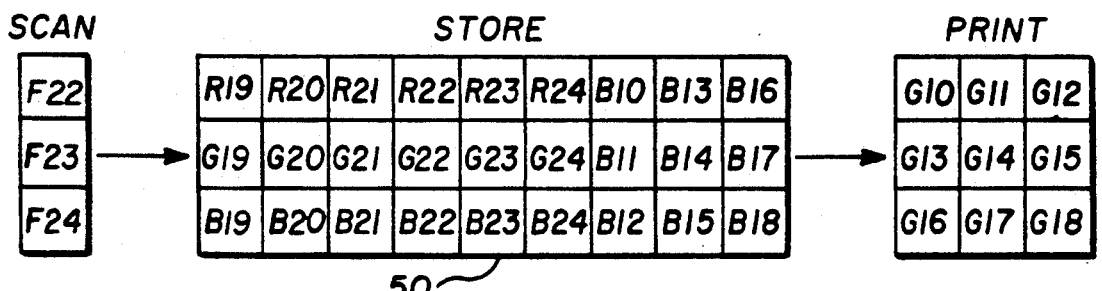
Figure 11:
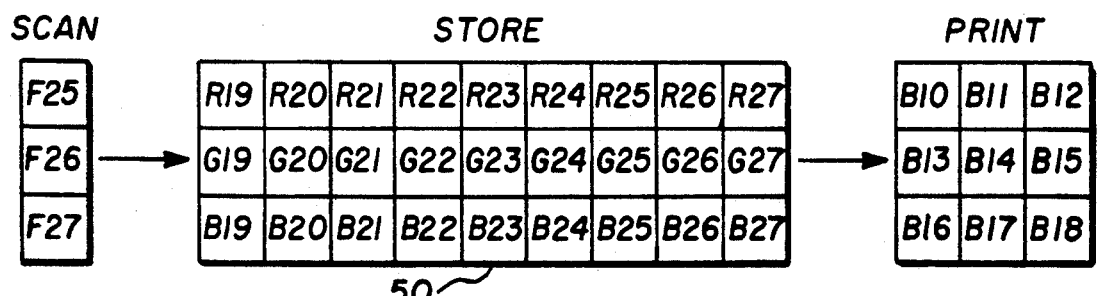
Figure 12:
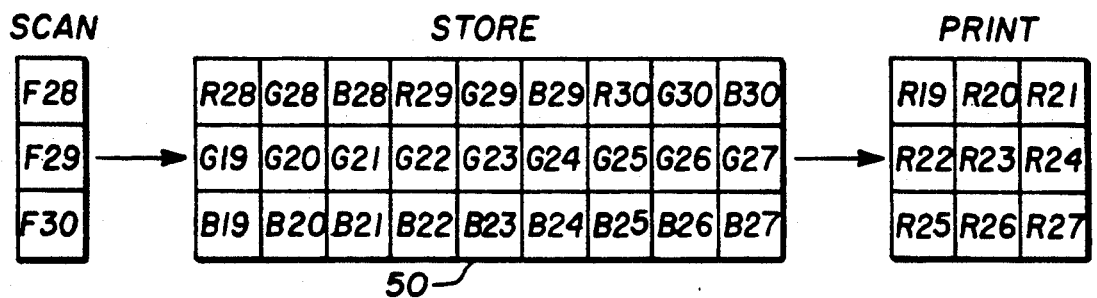
Figure 13:
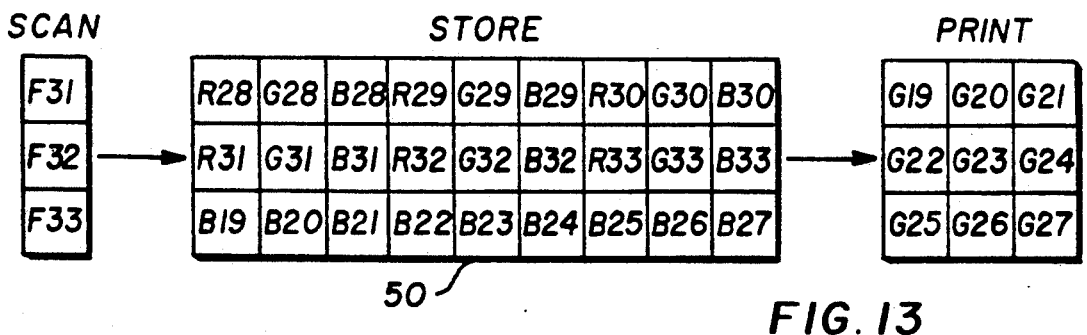
Figure 14:
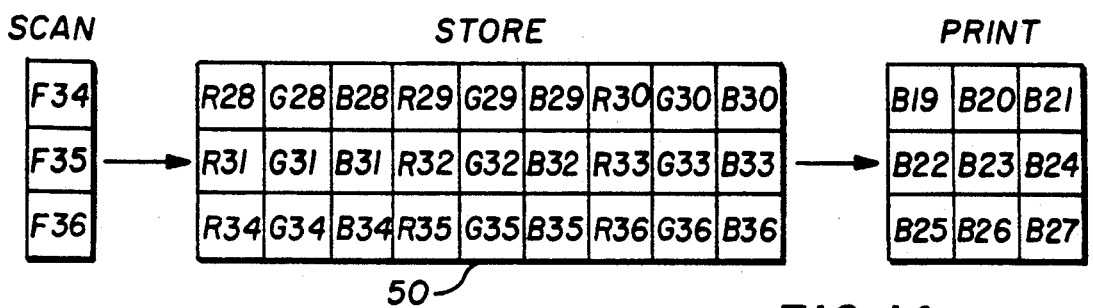
Figure 15:
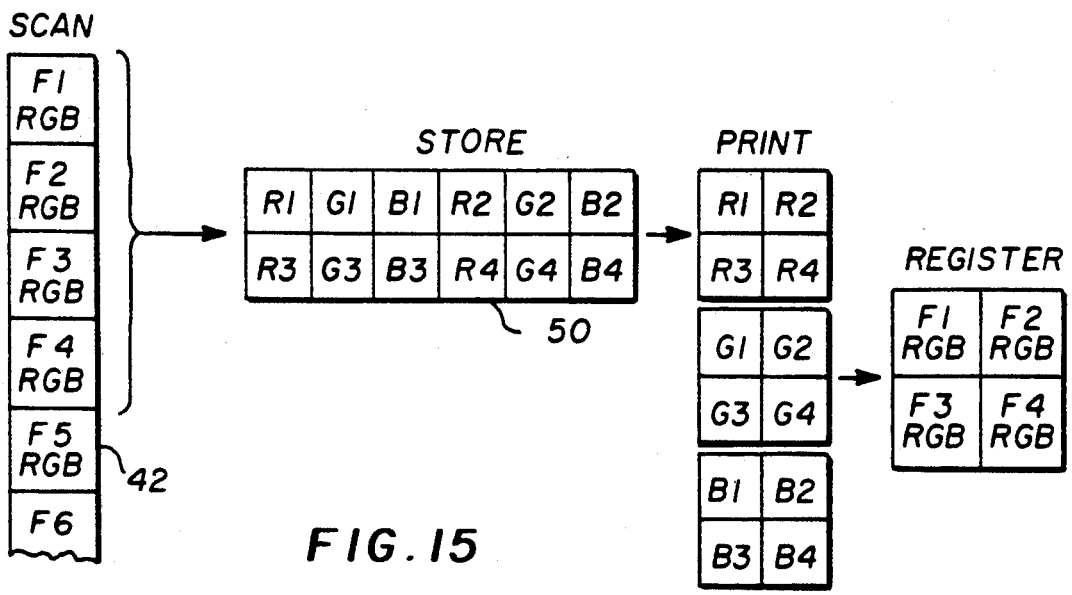
Figure 16:
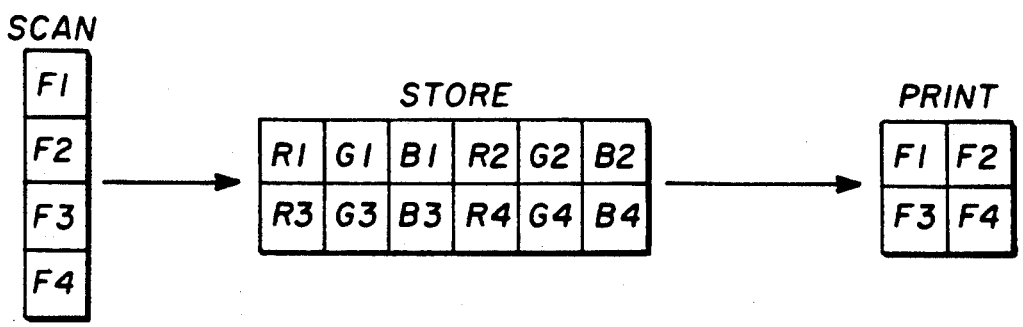

After printing the second full color "9-up" print (of frames F10-F18) and following the same guidelines for image storage and replacement as described above, the framestore contains all RG&B values required to print the third "9-up" print. The organization of these values is shown in FIG. 11, and the sequence for getting to this configuration is illustrated in FIGS. 9 and 10. As is apparent from FIGS. 12–14, the framestore will contain the RG&B values for frames 28–36 in the same organization as shown in FIG. 5 after the third "9-up" print is made. This has significant consequences. For one, the memory management unit (LCU 51) needs to know only three storage patterns; i.e., those of FIGS. 5, 8, and 11. This simplifies the hard/software considerably, because there is no need to keep track of every single pixel and its location in memory (framestore). The jam or "fault" recovery is also easier since it is known which framestore spaces have valid old data to be kept and which spaces have new data to be replaced. This type of memory management allows the use of only one framestore and thus eliminates the cost of a second framestore in a ping-pong fashion. It also allows the printer and the scanner to operate at their peak performance even though they "speak" differently. That is, the scanner generates RG&B data of an image at once, but the printer needs the RG&B information one at a time. For the sake of illustration, it was assumed that the printer prints the same color separations as those produced by the film scanner, i.e., red, green and blue. Actually, the printer usually prints the corresponding subtractive colors, i.e., cyan, magenta and yellow, required for a reflection-type print of a scanned color transparency.

In FIGS. 15–21, the manner in which data is managed to produce a 4-up print is illustrated. Here, the framestore need hold only twelve color-separated images, three for each of the four image frames F1–F4 being printed. Upon scanning the first four multicolor image frames of an original filmstrip 42, the color-separated images R,G and B are stored, as produced, in the format shown in FIGS. 15 and 16. Upon sequentially extracting the red images R1–R4, followed by the green images G1–G4 and the blue images B1–B4, and filling their spaces, as vacated, with the incoming R5, G5, B5 . . . R8, G8 and B8 images from the scanner, the format of stored image signals will be as shown in FIG. 17. This process of sequentially extracting all of the color separated signals of one color and replacing them with the R,G,B signals of the successively scanned frames is repeated, as described above with reference to the 9-up format. After the fifth 4-up print is made, i.e., the one with image frames F17–F20, one finds that the storage pattern begins to repeat. Thus, the storage format shown in FIG. 21 is the same as that shown in FIG. 16.

Figure 22:
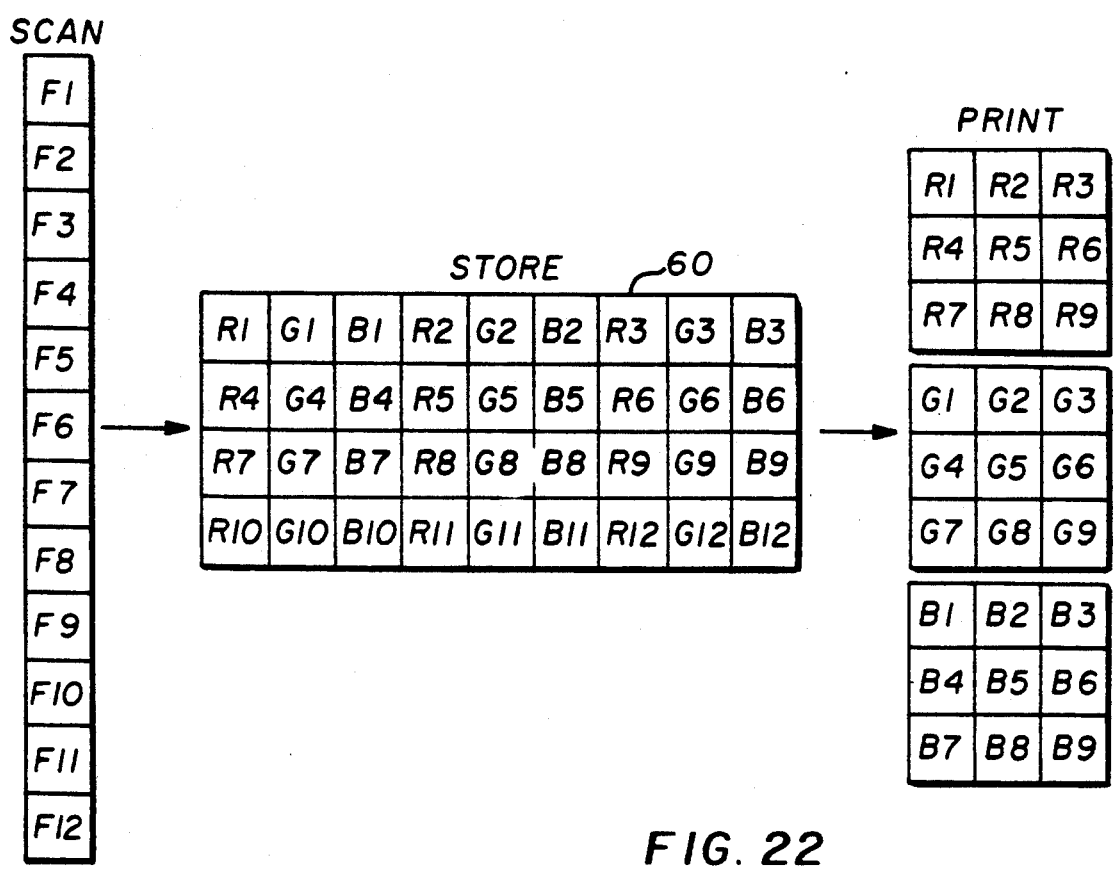
FIG. 22 illustrates an alternative framestore for the FIG. 1 apparatus.

Rather than using a framestore with a storage capacity sufficient to hold only enough color-separated images to print, say, one 9-up print, it is preferred that the framestore be somewhat larger, preferably of a size sufficient to store ⅓ more images than the absolute minimum. Assuming the printer is adapted to produce 9-up prints, then the storage capacity of the framestore would be capable of holding 36 color separated images. Such a framestore is shown in FIG. 22 where framestore 60 has a storage capacity to store each of three color-separated RGB for twelve original image frames. The management of the data within the framestore is the same as that described above, and it can be shown that, after the ninth 9-up print is made, the data format returns to the original format shown in FIG. 22. The reason for using more memory than absolute minimum (i.e., a framestore capable of holding the 27 images required for a 9-up image) is for easier timing synchronization between the printer and the input scanner. In using a framestore capable of holding only the same number of color separations as required for each 9-up print, the printer must begin printing the very moment the 27 separations of the first "9-up" print are put in the framestore; otherwise, the scanner has to be delayed until the printing begins. This can be very difficult. With a 54-megabyte storage capacity, as would be required to store 36 color separated images of near photographic quality, there are several seconds after the framestore is filled with the first 27 separations and before the next nine separations are sent to activate the printer. This is a resonable response time to expect from a printer. In other words, the extra storage space in the framestore acts as a nine-image (separation) FIFO (first-in, first-out) buffer between the scanner and the printer.

As an alternative to the 40.5 and 54 MB framestores discussed above, a 67.5 MB framestore could be used and still realize the advantage of the invention, i.e. lower storage cost. Of course, the closer the storage capacity of the framestore to that required to store the images required for two complete prints, the less cost savings there is. A 67.5 framestore would hold 45 of the color separated images required for a 9-up print and allow a comparatively loose synchronization between scanner and printer. After the fifteen 9-up print has been made, the data storage format begins to repeat.

From the foregoing description, it is apparent that framestore 50 has a storage capacity substantially less than twice that required to print from memory a desired multiframe color print. For example, in the case of a 9-up print which requires 27 color-separated image frames to print, framestore 50 holds fewer than 54 frames of color information. While it may hold as few as 27 frames of image data, it more preferably holds 36 image frames of data. The inventive concept is to use less than two framestores, preferably only one, or one and a fraction, and manage the data in the framestore such that it will store and then output the needed data properly without slowing the printer.

The invention has been described in detail with particular reference to preferred embodiments thereof, but it will be understood that variations and modifications can be effected within the spirit and scope of the invention.

What is claimed is:

1. An electronic color printing process in which an array of different multicolor images is produced on each of a plurality of print-receiver sheets from color information signals representing a plurality of sets of color-separated image information (R, G, B), each of such sets representing a color content, within three different spectral regions, of a plurality of multicolor images to be printed, such sets being provided in an image sequence, R1, G1, B1; R2, G2 B2; . . . Rn, Gn, Bn, where n is the number of the images to be printed on a receiver sheet, said process comprising the steps of:

a) storing values representing each set of color-separated image information, as produced, in a framestore at discrete address locations, said framestore having a storage capacity sufficient to hold less than twice a number of values associated with those sets of color-separated image information required to produce a desired array of multicolor images on a print-receiver sheet;

b) reading-out stored values from the framestore in a sequence R1, R2, R3, . . . Rn; G1, G2, G3, . . . Gn; B1, B2, B3, . . . Bn to enable sequential printing of a plurality of different color-separated images of the desired array of multicolor image frames, such different color-separation images being registerable to produce the desired array of multicolor images on a print-receiver sheet; and c) storing values representing subsequently produced sets of color-separated image information at address locations in the framestore vacated by the immediately preceding reading-out step.

2. The process as defined by claim 1 said color information signals are produced by scanning a linear array of multicolor images, one frame after another, with an electronic scanning device capable of providing a plurality of different sets of color-separated image information for each scanned frame, each set representing a color content of each scannned frame in three different spectral regions, all sets of color-separated image information for each frame being produced before a succeeding frame in the linear array is scanned.

3. An electronic color printer in which an array of different multicolor images is produced on each of a plurality of print-receiver sheets from color information signals representing a plurality of sets of color-separated image information (R, G, B), each of such sets representing a color content, within three different spectral regions, of a plurality of multicolor images to be printed, such sets being provided in an image sequence, R1, G1, B1; R2, G2, B2; . . . Rn, Gn, Bn, where n is a number of the images to be printed on a receiver sheet, said printer comprising:

a) a framestore for storing values representing each set of color-separated image information, as produced, at discrete address locations, said framestore having a storage capacity sufficient to hold less than twice a number of values associated with those sets of color-separated image information required to produce a desired array of multicolor images on a print-receiver sheet;

b) means for reading-out stored values from the framestore in a sequence R1, R2, R3, . . . Rn; G1, G2, G3, . . . Gn; B1, B2, B3, . . . Bn to enable sequential printing of a plurality of different color-separated images of the desired array of multicolor image frames, such different color-separation images being registerable to produce the desired array of multicolor images on a print-receiver sheet; and c) means for storing values representing subsequently produced sets of color-separated image information at address locations in the framestore vacated by the immediately preceding reading-out step.

4. The apparatus as defined by claim 3 further comprising means for scanning an array of multicolor images, one frame after another, to provide said color information signals.

5. The apparatus as defined by claim 3 wherein said framestore has a storage capacity of about 1.33 times the number of values associated with those sets of color-separated image signals required to produce said desired array.

6. The apparatus as defined by claim 3 wherein said framestore has a storage capacity of about 1.67 times the number of values associated with those sets of color-separated image signals required to produce said desired array.

7. An electronic color printing process in which a two-dimensional array of multicolor image frames is produced on an image-receiver sheet from an original comprising a linear array of multicolor image frames, said process comprising the steps of:

a) scanning the original, one frame after another, to produce a plurality of different sets of color-separation image signals for each scanned frame, each set representing a color content of each scanned frame in a different spectral region, all sets of color-separation image signals for each frame being produced before a succeeding frame in said linear array is scanned;

b) storing values representing each set of color-separation image signals, as produced, in a framestore at discrete address locations, said framestore having a storage capacity sufficient to hold less than twice a number of values associated with those sets of color-separated image signals required to produce a desired two-dimensional array of multicolor image frames on a receiver sheet;

c) reading-out stored values from the framestore in a sequence different from the sequence in which such values have been stored therein to enable sequential printing of a plurality of different color-separated images of said desired two-dimensional array of multicolor image frames, said different color-separation images being registerable to produce said desired two-dimensional array of multicolor image frames on an image receiver sheet; and d) simultaneously with said reading-out step, storing values representing subsequently produced sets of color-separation image signals at address locations in the framestore vacated by the immediately preceding reading-out step.

8. An electronic color printing process in which a two-dimensional array of multicolor image frames is produced on an image-receiver sheet from an information signal representing a linear array of multicolor image frames, said process comprising the steps of:

a) producing a data stream representing a plurality of different sets of color-separation image signals for each of a plurality of multicolor image frames arranged in a linear array, each set representing a color content of each of said multicolor image frames in a different spectral region, all sets of color-separation image signals for each multicolor image frame being produced before a sets of color-separation image signals of a succeeding multicolor image frame in said linear array are produced;

b) storing values representing each set of color-separation image signals, as produced, in a framestore at discrete address locations, said framestore having a storage capacity sufficient to hold less than twice a number of values associated with those sets of color-separated image signals required to produce a desired two-dimensional array of multicolor image frames on a receiver sheet;

c) reading-out stored values from the framestore in a sequence different from the sequence in which such values have been stored therein to enable sequential printing of a plurality of different color-separated images of said desired two-dimensional array of multicolor image frames, said different color-separation images being registerable to produce said desired two-dimensional array of multicolor image frames on an image receiver sheet; and d) simultaneously with said reading-out step, storing values representing subsequently produced sets of color-separation image signals at address locations in the framestore vacated by the immediately preceding reading-out step.

9. An electronic color printing process in which a three-by-three, two-dimensional array of multicolor image frames is produced on an image-receiver sheet from an information signal representing a linear array of nine multicolor image frames, said process comprising the steps of:

a) producing a data stream representing a plurality of different sets of color-separation image signals for each of nine multicolor image frames arranged in a linear array, each set representing a color content of each of said multicolor image frames in a different spectral region, all sets of color-separation image signals for each multicolor image frame being produced before sets of color-separation image signals of a succeeding multicolor image frame in said linear array are produced;
b) storing values representing each set of color-separation image signals, as produced, in a framestore at discrete address locations, said framestore having a storage capacity sufficient to hold less than twice a number of values associated with those sets of color-separated image signals required to produce a desired three-by-three, two-dimensional array of multicolor image frames on a receiver sheet;
c) reading-out stored values from the framestore in a sequence different from the sequence in which such values have been stored therein to enable sequential printing of a plurality of different color-separated images of said desired two-dimensional array of multicolor image frames, said different color-separation images being registerable to produce said desired two-dimensional array of nine multicolor image frames on an image receiver sheet; and
d) simultaneously with said reading-out step, storing values representing subsequently produced sets of color-separation image signals at address locations in the framestore vacated by the immediately preceding reading-out step.

10. An electronic color printing process in which a three-by-three, two-dimensional array of multicolor image frames is produced on an image-receiver sheet from an information signal representing a linear array of nine multicolor image frames, said process comprising the steps of:
a) producing a data stream representing three different sets of color-separation image signals, one for each of nine multicolor image frames arranged in a linear array, each set representing a color content of each of said multicolor image frames in a different spectral region, all three sets of color-separation image signals for each multicolor image frame being produced before three sets of color-separation image signals of a succeeding multicolor image frame in said linear array are produced;
b) storing values representing each set of color-separation image signals, as produced, in a framestore at discrete address location, said framestore having a storage capacity sufficient to hold 4/3 a number of values associated with those sets of color-separated image signals required to produce desired three-by-three, two-dimensional array of multicolor image frames on a receiver sheet;
c) reading-out stored values from the framestore in a sequence different from the sequence in which such values have been stored therein to enable sequential printing of a plurality of different color-separated images of said desired two-dimensional array of multicolor image frames, said different color-separation images being registerable to produce said desired two-dimensional array of nine multicolor image frames on an image receiver sheet; and
d) simultaneously with said reading-out step, storing values representing subsequently produced sets of color-separation image signals at address locations in the framestore vacated by the immediately preceding reading-out step.

* * * * *